United States Patent

[11] 3,582,234

[72] Inventors Jack Isreeli
Mamaroneck;
Aaron Kassel, Brooklyn, both of, N.Y.
[21] Appl. No. 841,351
[22] Filed July 14, 1969
[45] Patented June 1, 1971
[73] Assignee Technicon Corporation
Tarrytown, N.Y.

[54] METHOD AND APPARATUS FOR THE CALIBRATION OF TUBING TO PROVIDE FOR A DESIRED FLOW RATE THERETHROUGH
11 Claims, 7 Drawing Figs.

[52] U.S. Cl........................................................ 417/53,
92/13, 92/13.2, 138/45, 138/46, 251/4, 417/476,
417/477
[51] Int. Cl........................................................ F04b 43/08,
F04b 43/12
[50] Field of Search............................................ 138/45, 46;
251/4, 9; 103/148, 149; 230/160, 168; 91/57;
417/53, 476, 477; 418/45; 92/13, 13.2

[56] References Cited
UNITED STATES PATENTS

| | | | |
|---|---|---|---|
| 114,981 | 5/1871 | Shoenberger | 251/4 |
| 2,935,028 | 5/1960 | Ferrari, Jr. et al. | 103/149 |
| 3,034,504 | 5/1962 | Winsor et al. | 251/9 |
| 3,095,175 | 6/1963 | Iketani | 251/4 |
| 3,163,176 | 12/1964 | Darling | 251/9 |
| 3,206,157 | 9/1965 | Reading | 251/4 |
| 3,227,091 | 1/1966 | Isreeli et al. | 103/149 |
| 3,353,567 | 11/1967 | Isreeli | 103/149 |

*Primary Examiner*—Carlton R. Croyle
*Assistant Examiner*—Wilbur J. Goodlin
*Attorney*—S. P. Tedesco

ABSTRACT: New and improved method and apparatus for the calibration of a tube to accurately provide for a predetermined flow rate therethrough are provided and include the monitoring of the flow rate through the tube and, if the latter exceeds said predetermined flow rate, the reduction of the internal diameter of said tube while continuing to monitor the flow rate therethrough until the latter coincides with the desired flow rate.

PATENTED JUN 1 1971 3,582,234

INVENTORS
JACK ISREELI
AARON KASSEL

BY *James J. Brown, Jr.*
ATTORNEY

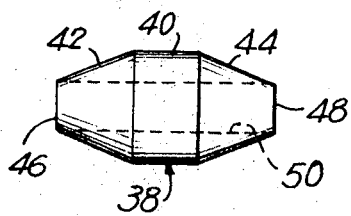
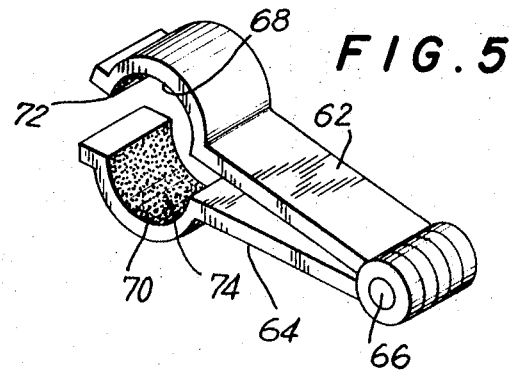
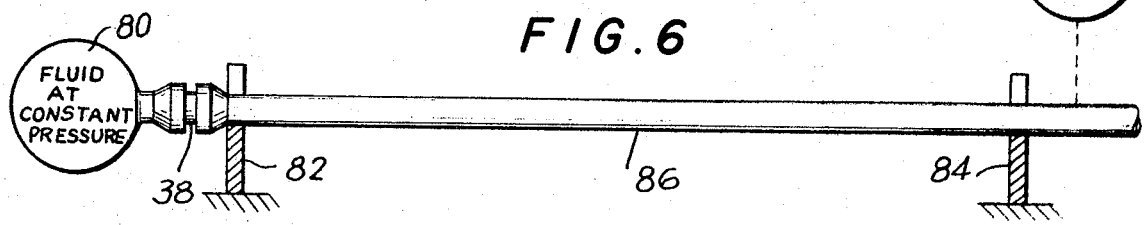
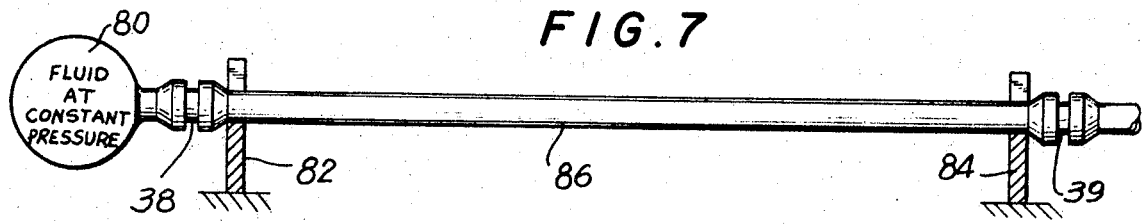

METHOD AND APPARATUS FOR THE CALIBRATION OF TUBING TO PROVIDE FOR A DESIRED FLOW RATE THERETHROUGH

BACKGROUND OF THE INVENTION

1. Field of the Invention

This invention relates to new and improved method and apparatus for the calibration of tubing to enable the accurate provision of a desired flow rate therethrough.

2. Background of the Invention

Advanced versions of constant flow rate, automatic fluid sample analysis means of the nature shown and described in U.S. Pat. No. 3,241,432, issued Mar. 22, 1966 to Leonard T. Skeggs, are operative, to significant advantage, at both substantially decreased, constant fluid sample flow rates and substantially increased fluid sample analysis rates per unit time, respectively to thus require less fluid sample per analysis while providing for many more sample analyses per unit time, as should be obvious. An additional advantage of said substantially decreased fluid sample flow rates resides in the fact that the same enable operation of the peristaltic or compressible tube pumps—which are included in such analysis means and are operative to pump said fluid samples therethrough—at substantially decreased operational rates, and with compressible pump tubes of optimal internal diameters. More specifically, and taking, for example, applications of such fluid sample analysis means to the automatic analysis of a series of blood serum samples, it may be understood that the use of tubing in said pump, or at other locations in said analysis means, having an internal diameter of less than 0.015 inch gives rise to a serious problem of clogging of such tubing by solid or semisolid materials in the nature, for example, of agglutinates which may be present in such blood serum samples. Accordingly, the use of tubing with an internal diameter greater than 0.015 inch, but still small enough as to be practically compatible with said substantially reduced flow rates, has proven desirable, it being understood that the fluid flow rates of interest will vary in direct proportion with the square of said internal tubing diameter. A problem which arises, however, in the use of such tubing having, for example, an internal diameter of 0.016 inch, is the fact that the same is not currently manufactured to small enough tolerances to insure that the internal diameter thereof does not vary from 0.016 inch to such extent as would give rise to an unacceptable variation in the flow rate therethrough and thus render the tubing unsatisfactory, in the absence of suitable calibration thereof, for use in such constant flow rate analysis means.

OBJECTS OF THE INVENTION

It is, accordingly, an object of this invention to provide method and apparatus for the calibration of tubing to accurately provide for a desired flow rate therethrough.

Another object of this invention is the provision of method and apparatus which involve the reduction of the internal diameter of a tubing to effect calibration thereof.

Another object of the invention is the provision of method and apparatus which involve the stretching of elastic tubing to reduce the internal diameter thereof.

A further object of this invention is the provision of method and apparatus which are particularly, though by no means exclusively, adaptable for use in the calibration of the elastic, compressible pump tubes of peristaltic type pumps which are included in constant flow rate, automatic fluid sample analysis means of the type discussed above, to accurately provide for a predetermined pump flow rate.

SUMMARY OF THE INVENTION

In a herein disclosed preferred embodiment, the method and apparatus of the invention are applied to the calibration of the elastic, compressible pump tubes of a peristaltic pump and, under the described circumstances regarding the initial choice of the internal diameter of the tube in relation to the desired pump flow rate, would include the monitoring of the fluid flow rate through the tube upon initial operation of the pump to determine if the same coincides with the desired flow rate and, in the event the latter is exceeded, the stretching of the tube to reduce the internal diameter thereof, and accordingly the fluid flow rate therethrough, while continuing to monitor said fluid flow rate until the latter coincides with said desired flow rate. This disclosure additionally makes clear that the method and apparatus of the invention are not limited to the calibration of compressible pump tubes but, rather, are applicable to the calibration of tubes which are utilized for other purposes in a fluid flow system.

BRIEF DESCRIPTION OF THE DRAWINGS

The above and other objects and advantages of the invention are believed made clear by the following detailed description thereof taken in conjunction with the accompanying drawings wherein;

FIG. 4 is a side elevational view of a tube locating and connecting nipple;

FIG. 5 is a perspective view of a tube clamping means for use in stretching the tube; and FIGS. 6 and 7 are side elevational views with parts in cross section illustrating the application of the method and apparatus of the invention to the calibration of a tube which does not form part of a peristaltic type pump.

DETAILED DESCRIPTION OF AN ENVIRONMENT FOR USE OF THE METHOD AND APPARATUS OF THE INVENTION

Figure 1:
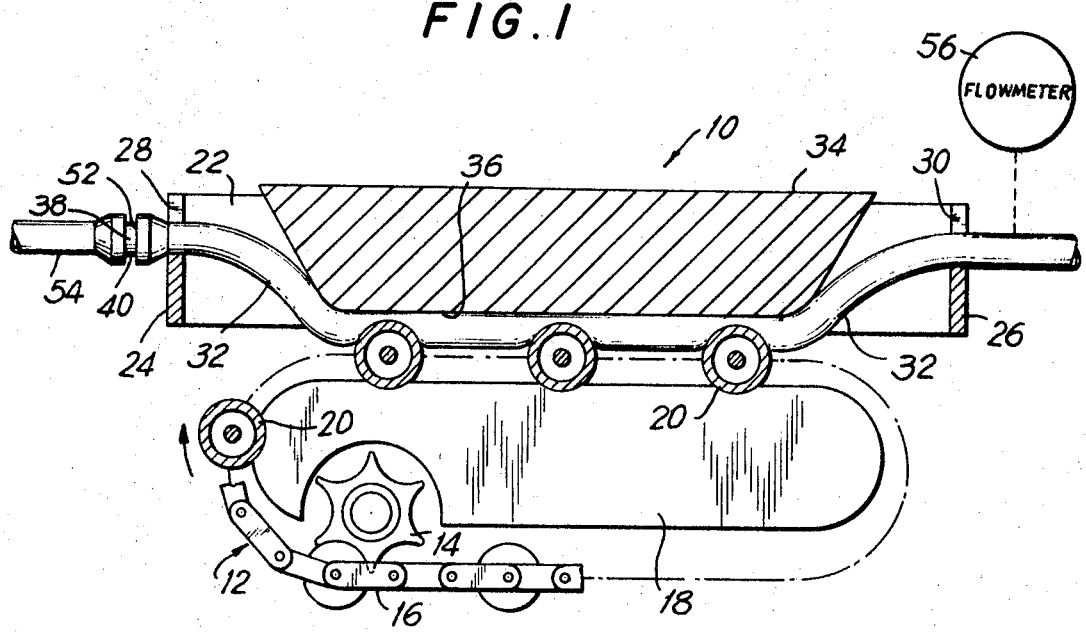
FIGS. 1 and 2 are generally longitudinal cross-sectional views taken through peristaltic type pump means to illustrate the application of the method and apparatus of the invention to the calibration of the pump tubes.

Referring now to FIG. 1, a peristaltic or compressible tube pump which may, for example, take the general form of that shown and described in U.S. Pat. No. 3,227,091 issued Jan. 4, 1966 to Jack Isreeli et al., is indicated generally at 10 and may be seen to comprise a roller assembly 12 which includes a chain sprocket wheel 14 and an endless chain 16 which is driveable, upon driven rotation of the former, in the indicated direction around a chain guide member 18.

A plurality of pump rollers 20 are disposed, as shown, with freedom for rotation at substantially equally spaced points on the endless chain 16, so as to be driveable therewith in said indicated direction.

Figure 3:
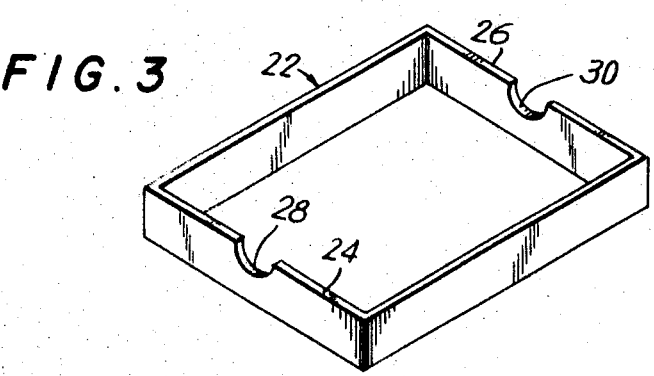
FIG. 3 is a perspective view of the tube-mounting frame utilized in the pump of FIGS. 1 and 2.

A generally rectangular pump tube-mounting frame is indicated at 22 and, as best seen in FIG. 3, comprises opposed end walls 24 and 26 having substantially aligned, pump tube-mounting notches 28 and 30 formed respectively therein.

A compressible pump tube 32 which is made from any suitably elastic and inert material of appropriate strength characteristics in the nature, for example, of silicone rubber, is extended, as shown, across the mounting frame 22 between the pump-mounting notches 28 and 30, and it may be understood that the respective bottom walls of said notches are configured in generally semicircular manner to complement the generally semicircular configurations of the corresponding portions of the said pump tube and provide for an appropriately close pump tube-notch fit.

A pump platen is indicated at 34 and may be understood to be movable from an "open" position thereof to the depicted "closed" position thereof wherein the upper portion of the compressible pump tube fits within a nonillustrated, complementally shaped groove formed in the lower surface of the said platen and is thusly forced to conform to the shape of the inner surface 36 of the said platen groove and compressed thereby, as shown, against the pump rollers 20.

Figure 2:
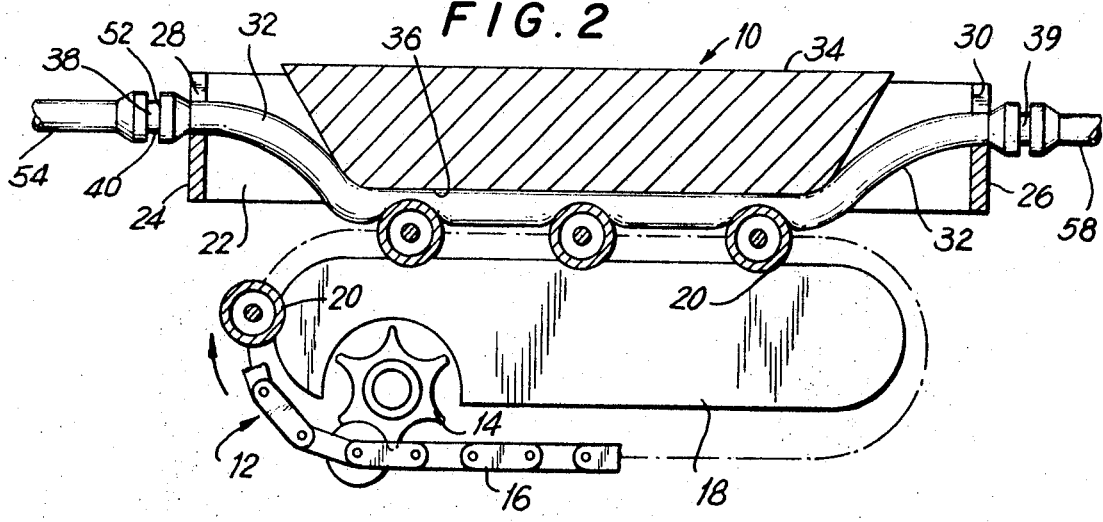

For operation of the peristaltic or compressible tube pump 10, the chain drive sprocket 14 is drivingly rotated in the clockwise direction, as seen in FIGS. 1 and 2, to drive the endless chain 16 in the indicated direction, with the result that the pump rollers 20 will progressively compress or occlude the compressible pump tube 32 longitudinally thereof to pump fluid therethrough in the direction from left to right, as seen in FIG. 1.

USE OF THE METHOD AND APPARATUS OF THE INVENTION IN THE ENVIRONMENT OF FIGS. 1 AND 2

For use of the method and apparatus of the invention in the calibration of a peristaltic or compressible tube pump of the nature depicted in FIGS. 1 and 2 to provide for an extremely accurate, predetermined flow rate therefrom, it may be understood that the respective pump components would be arranged as depicted with the compressible pump tube 32 operatively disposed between the platen 34 and pump rollers 20.

Prior to the commencement of the calibration operation, it may be understood that the inlet or upstream end of the compressible pump tube 32 would be substantially fixedly located relative to end wall 24 of frame 22 through use of a pump tube nipple 38. More specifically, and as best seen in FIG. 4, the nipple 38 comprises a generally cylindrical central portion 40 of substantially greater diameter than the internal diameter of the pump tube 32, and having inwardly tapered end portions 42 and 44 formed to opposite sides thereof and terminating in generally planar end faces 46 and 48, respectively. A bore 50 extends, as shown, between said end faces to provide a flow passage through said nipple. Although the nipple 38 may be made from any suitable, readily available material, it may be understood that relatively inert plastic materials in the nature, for example, of polyethylene have proven particularly satisfactory in this regard.

In use, the nipple 38 is extended, as shown, into the inlet end 52 of the compressible pump tube 32 to tightly stretch the latter around the nipple central portion 40 and provide for a secure, although readily removable, pump tube—nipple attachment. As a result of this substantial expansion of the inlet end portion of the pump tube 32 by the nipple 38, it may be understood that movement of said pump tube inlet end portion through the notch 28 to the right, as seen in FIG. 1, would be rendered impossible.

Following this, a length of suitably elastic tubing 54 is similarly attached as shown to the other side of the nipple 38 and the former suitably connected to any convenient, nonillustrated source of a fluid in the nature of that to be operationally pumped through the peristaltic pump 10 following the calibration thereof.

For use of the method and apparatus of the invention in the calibration the peristaltic pump 10, the compressible pump tube 32 would be chosen to have an internal diameter no smaller than that predetermined to provide the desired flow rate, it being understood that such flow rate will be dependent primarily upon the square of said internal diameter and the velocity of the respective pump rollers longitudinally of said pump tube.

Operation would then be commenced by driven rotation of the chain drive sprocket 14 at substantially constant, predetermined speed to provide for a substantially constant roller velocity relative to the compressible pump tube 32. Thereafter, or as soon as the steady state operational condition of the peristaltic pump 10 had been reached, monitoring of the pump flow rate would be commenced by observance of the flowmeter 56. If, as would be the case in many instances under the conditions discussed hereinabove with regard to the internal diameter of the chosen compressible pump tube 32, the thusly monitored flow rate exceeds the desired flow rate, the internal diameter of the compressible pump tube 32 would be reduced, by the stretching of the said pump tube longitudinally thereof, to reduce the flow rate therethrough until such time as the said flow rate is indicated by flowmeter 56 to coincide with said desired flow rate whereupon the pump tube 32 would be clipped, if necessary, and the downstream or outlet end portion thereof fixedly secured to the frame wall 26 by the disposition therein of another nipple as indicated at 39, in the same manner described hereinabove with regard to nipple 38.

With regard to the manner in which the compressible pump tube 32 is stretched longitudinally thereof, it may be understood that any convenient means in the nature, for example, of the illustrative tube clamp 60 of FIG. 5 may be utilized for this purpose. More specifically, and as seen in FIG. 5, said clamp comprises arms 62 and 64 which are pivotally connected at corresponding extremities by a pivot pin 66 extending through aligned bores provided therein.

Complementally shaped grooves 68 and 70 are provided in the arms 62 and 64 adjacent the corresponding other extremities thereof, and it may be understood that said grooves are sized to provide a generally cylindrical opening of a diameter which is substantially the same or, in the alternative, very slightly smaller than, the external diameter of the compressible pump tube 32 when the respective arms 62 and 64 are manually pressed together to clasp the said pump tube in the said opening. If desired, coatings of any suitably abrasive material may be deposited as indicated at 72 and 74 on the surfaces of the said grooves to improve the tube gripping action thereof as should be obvious.

In the alternative, it may be understood that the stretching of the compressible pump tube 32 may be accomplished by the simple manual grasping of the downstream or outlet end portion thereof.

Following the clipping of the compressible pump tube 32 and the insertion of the nipple 39 therein, another elastic tube 58 may, of course, be conveniently attached to the other side of the nipple 39, again as described hereinabove, to provide a conduit for pump outlet.

In the alternative, that is, if the flow rate through the compressible pump tube 32 is indicated by flowmeter 56 to coincide with the desired flow rate when the peristaltic pump 10 assumes steady state operational conditions and, thus, indicate that the pump tube internal diameter is initially of the desired dimension, it may be understood that no stretching of the said pump tube to reduce the internal diameter thereof would be required, whereby the former would simply by clipped, and the nipple 39 attached thereto, all as discussed hereinabove.

For use, for example, of the method and apparatus of the invention in advanced versions of the peristaltic pump 10 which may include as many as 16 compressible pump tubes and would function to pump as many streams of series of fluid samples from advanced versions of sample supply means in the nature of those shown and described in U.S. Pat. No. 3,134,263 issued May 26, 1964 to Edward B. M. DeJong, to advanced versions of fluid sample analysis means in the nature of those shown and described in U.S. Pat. No. 3,241,432 issued Mar. 22, 1966 to Leonard T. Skeggs, it may be understood that pump rollers 20 might be arranged to move at a velocity of 10 inches per minute relative to the said pump tubes to provide a desired fluid sample flow rate of 25 lambda per minute without fluid sample clogging in each of the said pump tubes.

These pump roller speed-desired fluid sample flow rate conditions would require each of the said pump tubes to have an internal diameter of 0.016 inch, and it may be understood that the latter is satisfactory from the standpoint of inhibition of fluid sample clogging of the tubes. More specifically, and as discussed hereinabove with regard to the pumping of fluid samples in the nature of blood serum samples prepared in accordance with current preparation methods, it has been determined that the use of pump tubes having an internal diameter greater than 0.015 inch is preferable to substantially inhibit the clogging thereof by solid or semisolid materials in the nature of agglutinates which may be present in the said blood serum samples.

If silicone rubber is chosen for the said pump tubes on the basis of the eminently satisfactory elasticity and strength characteristics thereof, it may be understood that the same must, of necessity, be ordered with an internal diameter of 0.018 inch, since the minimum tolerances specified by the manufacturers thereof are ±0.002 inch. This is, if silicone rubber tubing with an internal diameter of less than 0.018 inch were chosen and the same happened to exhibit the maximum minus 0.002 inch tolerance, such tubing would be unsatisfactory because the internal diameter thereof would be less than 0.016 inch and cannot, of course, be practically increased.

With the choice of 0.018±0.002 inch internal diameter tubing to form the pump tubes 32 it will, of course, be necessary, in most instances, to reduce the internal diameter thereof by stretching the same, as described in detail hereinabove, until a flow rate therethrough of 25 lambda per minute were indicated on flowmeter 56, whereupon the said tubing could be fixed in place by use of a nipple 39, again as described in detail hereinabove, to complete the calibration process and insure the provision of a fluid sample flow rate of 25 lambda per minute therethrough, it being understood that the calibration process would, of course, be utilized for each of the pump tubes employed in the peristaltic pump.

In the alternative, or that is to say in those relatively few instances wherein the internal diameter of the supplied 0.018 inch tubing is exactly 0.016 inch, it may be understood that the flowmeter 56 will initially indicate the desired 25 lambda per minute fluid sample flow rate, whereupon the said tubing may be promptly fitted in place through the use of a nipple 39 without requiring any reduction in the internal diameter thereof as should be obvious.

Although disclosed in detail hereinabove as applicable to the calibration of the compressible pump tubes of peristaltic pump means, it may be understood that the method and apparatus of the invention are also applicable to the calibration of elastic tubes which do not form a part of such pump means. More specifically, and as illustrated in FIGS. 6 and 7 wherein a source of fluid at predetermined, substantially constant pressure is indicated at 80 and notched walls in the nature of frame walls 24 and 26 indicated at 82 and 84, respectively, it may be understood that a length of elastic tubing 86 may be conveniently and accurately calibrated to provide for a desired flow rate therethrough—assuming, of course, that the internal diameter of tubing 86 is initially no smaller than that required to provide the desired flow rate and is practically reduceable, as by stretching, to the required dimension by the operative connection of a flowmeter 56 thereto as shown and the subsequent calibration thereof in the manner disclosed hereinabove for the calibration of pump tube 32.

Further, and although disclosed hereinabove as utilizing means in the nature of nipples 38 and 39 to fixedly locate the respective inlet and outlet end portions of the tube being calibrated, it may be understood that other and different means may be utilized for this purpose. Thus, for example, other and different tube locating means in the nature of the tube locating collars shown and described in U.S. Pat. No. 3,353,567 issued Nov. 21, 1967 to Jack Isreeli may be utilized, it being understood that suitable affixation thereof to silicone rubber tubing may require the use of an epoxy base glue. In addition, it is believed clear that the tube clamping means of FIG. 5 are, of course, intended as illustrative, only, of a wide variety of such means which may find satisfactory utilization in the stretching of the tubes.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

We claim:

1. In a method of providing for a desired flow rate through a tube of elastic material, the steps of, flowing fluid through said tube and, if the flow rate of said fluid is greater than said desired flow rate, reducing the internal diameter of said tube by the stretching of said tube longitudinally thereof while monitoring the flow rate therethrough until the latter coincides with said desired flow rate.

2. In a method as in claim 1 wherein, the step of flowing fluid through said tube is accomplished by the pumping of fluid therethrough.

3. In a method as in claim 1 further comprising, the step of, maintaining said tube in the stretched condition thereof after said flow rates have coincided.

4. In a method as in claim 2 wherein, the step of pumping fluid through said tube is accomplished by the progressive occlusion of said tube longitudinally thereof in the direction of fluid flow therethrough.

5. In apparatus for providing a desired flow rate through a tube of elastic material comprising, means for flowing fluid through said tube, and means for reducing the internal diameter of said tube, if the flow rate therethrough is greater than said desired flow rate, while monitoring the flow rate therethrough until the latter coincides with said desired flow rate, said reducing means comprising means for stretching said tube longitudinally thereof.

6. In apparatus as in claim 5 wherein, said means to flow fluid through said tube comprise means to pump fluid therethrough.

7. In apparatus as in claim 5 further comprising, means for maintaining said tube in the stretched condition thereof after said flow rates have coincided.

8. In apparatus as in claim 6 further comprising, means for maintaining said tube in the stretched condition thereof after said flow rates have coincided.

9. In apparatus as in claim 6 wherein said means to pump fluid through said tube comprise means to progressively occlude said tube longitudinally thereof in the direction of fluid flow therethrough.

10. In a method of providing for a desired flow rate of a fluid flowing through a tube of elastic material, the steps of, monitoring the flow rate of said fluid flowing through said tube and, if said flow rate exceeds said desired flow rate, reducing the internal diameter of said tube by longitudinally stretching said tube while continuing to monitor the said flow rate until the latter coincides with said desired flow rate.

11. In apparatus for providing a desired flow rate of a fluid flowing through a tube of elastic material, means for monitoring the flow rate of said fluid flowing through said tube, and means for reducing the internal diameter of said tube, if the flow rate therethrough is greater than said desired flow rate, while continuing to monitor the flow rate therethrough until the latter coincides with said desired flow rate, said means for reducing the internal diameter including means for longitudinally stretching said tube.